March 17, 1936. C. SAUZEDDE 2,033,958
HEAT DISSIPATING BRAKING WHEEL FELLY AND TIRE RIM SUPPORT
Filed Aug. 20, 1931 3 Sheets-Sheet 1

INVENTOR
Claude Sauzedde,
BY
ATTORNEYS

March 17, 1936.  C. SAUZEDDE  2,033,958
HEAT DISSIPATING BRAKING WHEEL FELLY AND TIRE RIM SUPPORT
Filed Aug. 20, 1931   3 Sheets-Sheet 2

INVENTOR
Claude Sauzedde,
BY
ATTORNEYS

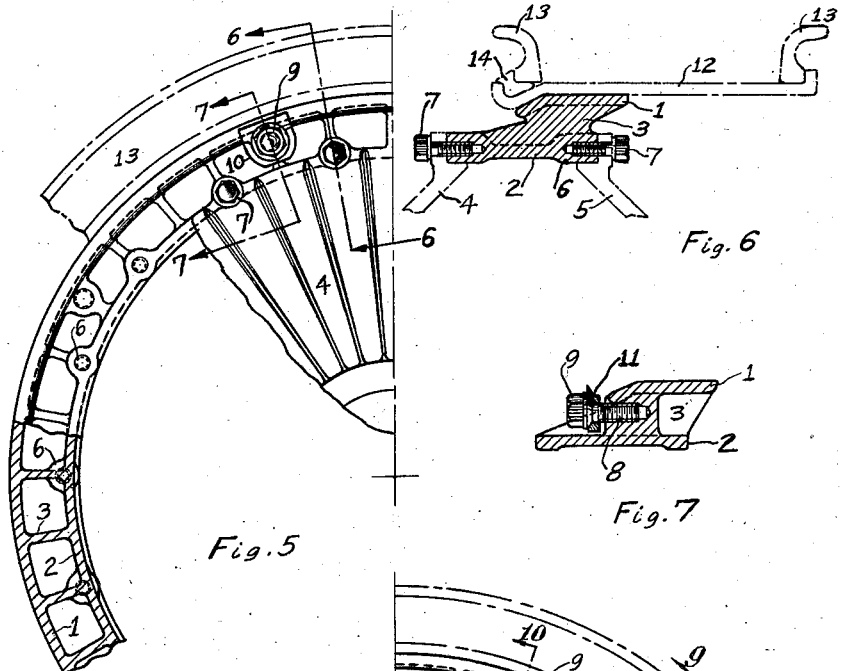
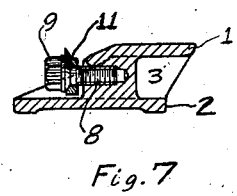
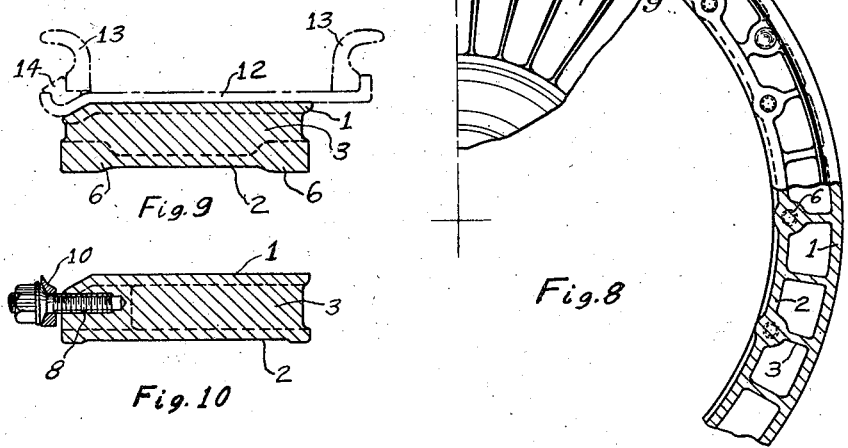
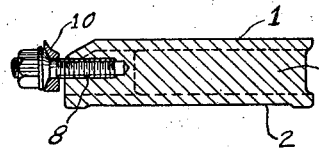

Patented Mar. 17, 1936

2,033,958

UNITED STATES PATENT OFFICE 2,033,958

HEAT-DISSIPATING BRAKING-WHEEL FELLY AND TIRE-RIM SUPPORT

Claude Sauzedde, Detroit, Mich., assignor to Detroit Hydrostatic Brake Corporation, Detroit, Mich., a corporation of Michigan Application August 20, 1931, Serial No. 558,298

2 Claims. (Cl. 301—6)

The present invention relates to fellies especially adapted for dissipating the heat energy generated when the fluid-pressure actuated brakes of hydrostatic braking wheels are applied, the ventilated felly, to which the developed heat is transferred from the braking hub members of the wheel by conduction, being cooled by circulation of air around and between a plurality of symmetrically-spaced integral webs that connect and give supporting strength to the inner and outer peripheral elements of the felly.

While the primary object of the invention is to provide effective means for dissipating brake-generated heat through a wheel felly adapted to be air cooled, a secondary object is to provide a felly structure also adapted to serve as a tire-supporting and piloting hub-member-spacing ring corresponding to part 1 of my copending application Serial No. 440,276, filed March 31, 1930, but differing from the latter in being so modified as to permit of cooling it and of applying to the outer periphery thereof either single-tire or dual-tire rims, application of the latter being indicated in plan by Fig. 1 and in sectional elevation by Fig. 3.

Heretofore little attention has been given to the problem of producing a ventilated type of wheel felly such as is herein described and illustrated, because, until recently, there existed no heavy-duty road-vehicle wheels having the tremendous fluid-pressure braking power necessary in order to make high-speed operation of vehicles of large load-carrying capacity particularly safe in traffic emergencies. But with the introduction of self-contained hydrostatic braking wheels with completely enclosed braking mechanism having a movement-resisting capacity in excess of 100,000 inch pounds per wheel, the need for brake-generated heat dissipation to reduce stresses and fluid-pressure fluctuations due to expansion has become sufficiently pronounced to bring about development of the herein described means for solving the problems involved.

Several embodiments of my invention are presented in the accompanying drawings, of which Figure 1 is a partly sectional elevation of a heavy-duty hydraulic braking wheel having a transversely pierced heat-dissipating felly providing peripheral support for a pair of tire rims held in spaced-apart parallel relation by a spacing ring abutting against the inner edges of the two rims, which are demountably held in place on the felly by an outer retaining ring having inwardly directed radially-disposed pierced lugs for bolts passing therethrough and into the felly;

Fig. 2 is a side elevation showing portions of the vented wheel felly, tire rims, retaining ring, and a fragment of one of the two externally-ribbed heat-dissipating oppositely-disposed brake-shoe contacting hub members to which the wheel felly is detachably bolted, as indicated by Figs. 1 and 3;

Fig. 3 is a transverse cross-sectional elevation of the wheel felly along line 3—3 of Fig. 2 showing how the outer periphery thereof is shaped for seating and supporting the tire rims, the spacing and retaining rings, and how the felly is attached to the two oppositely-disposed spaced-apart brake-shoe contacting side members of the wheel hub, the felly serving a double purpose as both piloting and spacing member between the brake-shoe contacting hub side members;

Fig. 5 represents a combined sectional view and elevation of a portion of a ventilated braking-wheel felly having straight transversely-disposed radial webs integral with and connecting the inner and outer peripheral elements of the felly structure, to which the tire rim is held in a slightly different manner than is indicated by Figs. 1, 2, and 3;

Fig. 6 is a transverse cross sectional view of the felly along line 6—6 of Fig. 5 showing offset application of single-tire rim and retaining ring, the outer edge of the outer peripheral element of the felly being shaped to serve as an abutment for the angularly-disposed under side of the outer edge of the tire rim, the inner peripheral element of the felly serving as piloting means for maintaining alignment of the spaced-apart oppositely-disposed braking hub side members, between which the felly is held in the manner indicated;

Fig. 7 is a transverse sectional view of the felly along line 7—7 of Fig. 5 showing application of tire-rim retaining lug and bolt by which rim is held on felly;

Fig. 8 represents a combined elevation and sectional view of a portion of a relatively shallow heavy-duty heat-dissipating felly having straight radially-disposed transverse webs, the outer peripheral elements of the felly being of the same width as that shown in Figs. 1 to 4 and having more than double the area of rim supporting surface of the outer peripheral element of the felly shown in Figs. 5 to 7;

Fig. 9 is a transverse cross sectional elevation along line 9—9 of the felly and offset single-tire rim of Fig. 8;

Fig. 10 is a transverse cross sectional elevation along line 10—10 of the felly of Fig. 8 showing tire lug and bolt by which the rim is held against an angularly-disposed surface forming part of the outer edge of outer peripheral element of felly.

Figure 1:
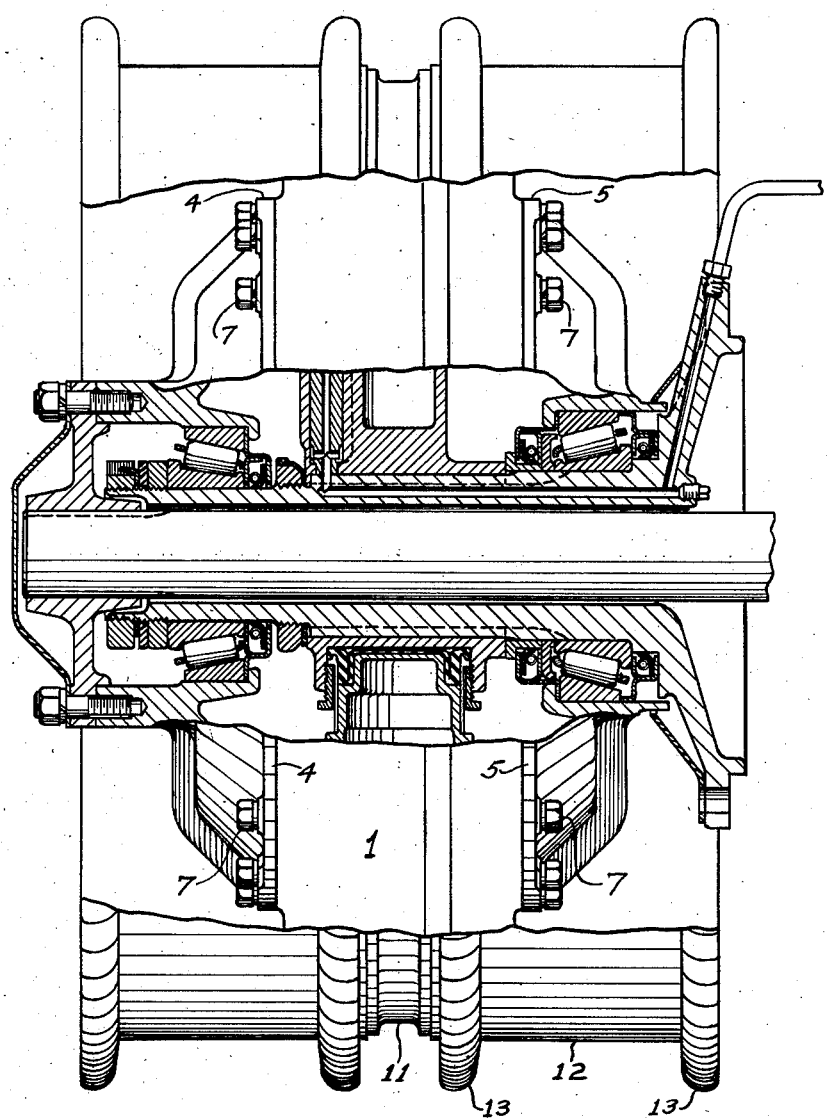

On all drawings similar parts are indicated by the same reference figures, a few of which identify certain parts of the hydrostatic braking-wheel structure to which my heat dissipating felly is applied in the manner indicated by Fig. 1, wherein the felly is broken away to give an idea of internal brake construction, with most of the details of which the present application is not concerned.

Figure 2:
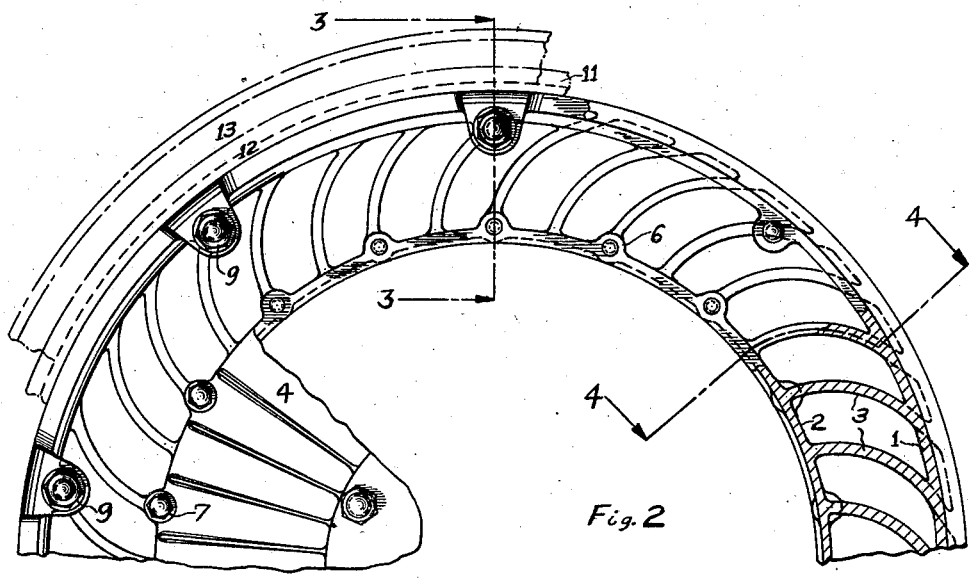
Figure 3:
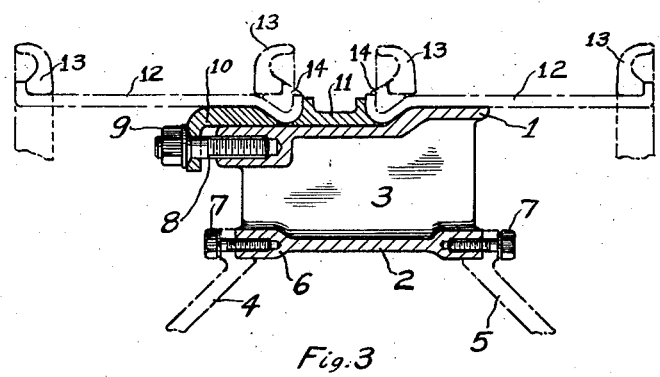
Figure 4:
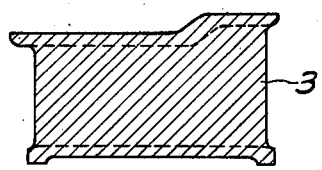
Fig. 4 is a cross sectional view along line 4—4 of Fig. 2 showing one of the arcuately-shaped symmetrically spaced transversely-disposed supporting webs integrally connecting the inner and outer peripheral elements of the felly, the air circulating in the spaces between the webs serving to dissipate the heat energy generated by application of brakes.

My heat-dissipating felly is a unitary vented-ring structure serving not only to support dual-tire rims, as indicated by Figs. 1 to 3, and single-tire rims, as indicated by Figs. 5 to 10, but also as piloting means whereby the oppositely-disposed spaced-apart brake-shoe contacting members 4 and 5 of the wheel hub are rigidly held thereto in unchanging alignment, which is not disturbed when the outer member 4 of the wheel hub is removed and spider for supporting brake-actuating mechanism is withdrawn for replacement of worn-out brake shoes, such removal and replacement of parts being possible without "jacking up" or lifting the vehicle to relieve the weight stress on wheel and tire.

The outer peripheral element 1 of the felly is integrally connected with the inner peripheral element 2 by spaced-apart supporting webs 3, which may be of arcuate form, as shown by Fig. 2, or of a straight radial type, as indicated by Figs. 5 and 6, the air flowing through the channels formed between the webs serving to carry away the heat generated at the brake-shoe contacting surfaces of hub side members 4 and 5 when brakes are applied, the heat being transferred from hub members to felly by conduction.

As shown in Figs. 3, 6, and 9, each side of the inner peripheral element 2 is provided with a plurality of equally-spaced bosses 6 drilled and tapped to receive the cap screws 7 that hold the felly in the piloting recesses of the hub outer and inner brake-shoe contacting side members 4 and 5.

The outer edge of the outer peripheral element 1, as indicated by Figs. 3, 7, and 10 is similarly provided with a smaller number of equally-spaced bosses drilled and tapped to receive the tire-lug stud bolts 8 on which are screwed cone-faced nuts 9 bearing against conically-formed seats in tire-rim retaining lugs 10, the spacing ring 11, rims 12, retaining rings 13, and locking rings 14 representing well-known constructional features that do not constitute any part of my invention, which concerns the felly only, having to do with means for dissipating therefrom the heat generated when brakes are applied.

Where the distance between the inner and outer peripheral elements of the felly is sufficient to permit of it, as when heavy-duty tires of large diameter are to be used, fellys having supporting webs of arcuate contour, as shown in Fig. 2, are desirable, but a shallow or thinner felly having straight radially-disposed transverse webs, as shown in Figs. 5 and 8, may be used with the same size hub when tires of lesser diameter and smaller cross section are to be employed, interchangeable fellys affording convenient means for making wheel size changes at relatively small expense.

As indicated by Figs. 3, 6, and 9 my felly is adapted to support one or more tire rims in offset relation to a plane embracing the center line of the braking wheel hub structure, between the oppositely disposed sides of which the felly is held in symmetrical relationship.

Having described the construction and application of my braking-wheel felly with a sufficient degree of clarity to enable others to understand and make use of my invention, what I claim is:—

1. In wheel structures adapted for heavy duty braking service, wherein opposing side members of the wheel form housing elements for an enclosed brake mechanism individual to the wheel, and wherein the side members carry the brake surfaces with which the brake mechanism co-operates under high-pressure braking conditions, the combination with such side members, of an annular element for spacing the side members, said element completing the enclosing housing for the brake mechanism with the side members detachably secured to the element, the inner wall of the element being spaced a radial distance from the wheel axis less than the similar distance of the peripheries of the side members, said element carrying a tire-seat mounting formation and having an annular laterally-channelled heat-dissipating zone active in reducing heat transference between the housing and such mounting formation, said zone being intermediate the tire seat and the inner wall portion of the annular element radially of the wheel, whereby the side members and brake mechanism are usable interchangeably with tire structures differing in characteristics, said heat-dissipating zone having equally-spaced transversely-extending webs connecting the inner and outer peripheral portions of the element.

2. A wheel structure as in claim 1 characterized in that the webs are curved.

CLAUDE SAUZEDDE.